(12) United States Patent
Halverson et al.

(10) Patent No.: US 8,406,413 B2
(45) Date of Patent: Mar. 26, 2013

(54) METHOD AND APPARATUS FOR UNIVERSAL XDSL DEMARCATION INTERFACE WITH MULTI-FUNCTIONAL CAPABILITY AND SIGNAL PERFORMANCE ENHANCEMENT

(75) Inventors: David Halverson, Moore, SC (US);
Edward Kimbrell, Dacula, GA (US);
Ted Lichoulas, Simpsonville, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 750 days.

(21) Appl. No.: 12/532,963

(22) PCT Filed: Apr. 22, 2009

(86) PCT No.: PCT/US2009/002489
§ 371 (c)(1),
(2), (4) Date: Sep. 24, 2009

(87) PCT Pub. No.: WO2009/131675
PCT Pub. Date: Oct. 29, 2009

(65) Prior Publication Data
US 2011/0170579 A1     Jul. 14, 2011

Related U.S. Application Data

(60) Provisional application No. 61/142,417, filed on Jan. 5, 2009, provisional application No. 61/046,825, filed on Apr. 22, 2008, provisional application No. 61/081,430, filed on Jul. 17, 2008.

(51) Int. Cl.
*H04M 1/00* (2006.01)
(52) U.S. Cl. ............. 379/399.01; 379/32.04; 379/329; 379/413.02
(58) Field of Classification Search ............. 379/1.03, 379/1.04, 9.04, 32.04, 329, 399.01, 413.02; 375/222
See application file for complete search history.

(56) References Cited

U.S. PATENT DOCUMENTS

| | | | | |
|---|---|---|---|---|
| 6,026,160 | A  * | 2/2000 | Staber et al. | 379/413.03 |
| 6,996,232 | B1 * | 2/2006 | Staber et al. | 379/413.02 |
| 7,164,708 | B1   | 1/2007 | Hauptmann et al. | |
| 2001/0026607 | A1 * | 10/2001 | Scholtz et al. | 379/30 |
| 2002/0041676 | A1   | 4/2002 | DeCramer et al. | |
| 2005/0047497 | A1   | 3/2005 | Rubinstain et al. | |
| 2006/0159162 | A1 * | 7/2006 | Shrikhande et al. | 375/222 |

* cited by examiner

*Primary Examiner* — Gerald Gauthier
*Assistant Examiner* — Simon King
(74) *Attorney, Agent, or Firm* — Sughrue Mion, PLLC

(57) ABSTRACT

Provided is an apparatus for splitting an input signal, the apparatus including a xDSL profile filter for filtering a first sub-signal from the input signal, the first sub-signal according to a xDSL profile, and outputting a xDSL profile output signal; a voice-band filter for filtering a second sub-signal from the input signal, the second sub-signal according to a voice frequency band, and outputting a voice-band output signal; and a user interface for selecting a xDSL profile mode, wherein the xDSL profile mode is consistent with one of a plurality of xDSL profiles, and wherein the xDSL profile filter filters the first sub-signal according to the xDSL profile mode.

9 Claims, 8 Drawing Sheets

(a)

(b)

METHOD AND APPARATUS FOR UNIVERSAL XDSL DEMARCATION INTERFACE WITH MULTI-FUNCTIONAL CAPABILITY AND SIGNAL PERFORMANCE ENHANCEMENT

CROSS-REFERENCE TO RELATED APPLICATION

This application claims priority from U.S. Provisional Patent Applications No. 61/046,825 filed Apr. 22, 2008, No. 61/081,430, filed Jul. 17, 2008; and No. 61/142,417, filed Jan. 5, 2009, in the United States Patent and Trademark Office, their disclosure incorporated herein by reference in its entirety.

BACKGROUND

1. Field of the Invention

Methods and apparatuses consistent with the present invention relate to a method and apparatus for the selection of a Digital Subscriber Line scheme from among all Digital Subscriber Line schemes, profiles, and combinations, collectively referred to as xDSL; implementation of filtering and other signal enhancements of an xDSL signal, and universal demarcation physical interconnect of xDSL within all common Network Interface Devices (NIDs).

2. Description of the Related Art

ITU-T G.993.2 (02/2006) (Series G: TRANSMISSION SYSTEMS AND MEDIA, DIGITAL SYSTEMS AND NETWORKS—Very high speed digital subscriber line transceivers 2 (VDSL2)) discloses an access technology that exploits the communication infrastructure deployed for plain-old telephone service (POTS) systems. In particular, ITU-T G.993.2 discloses a data delivery scheme within the POTS system which includes eight (8) VDSL2 profiles.

Other related publications and standards include ITU-T G.992.1 Asymmetric Digital Subscriber Line (ADSL); ITU-T G.992.3 Improved Standardization of ADSL (ADSL2); ITU-T G.992.5 Extension of ADSL2 With Double Bandwidth (ADSL2+); ITU-T G.993.1 Very High Speed Digital Subscriber Line (VDSL); ITU-T G.991.2 Symmetric High Speed DSL (SHDSL). ITU-T G.993.2, G.992.1, G.992.3, G.992.5, G.993.1, and G.991.2, are hereby incorporated by reference in its entirety.

Collectively these data transmission methods have come to be known, and are referred to as xDSL. xDSL profiles relate to specific frequency plans, power spectral density (PSD), modulation schemes, noise mitigation techniques and data rates for transmission of data within a POTS system employing an unshielded twisted pair wire (UTP), but are not limited to this transmission medium and are, on occasion, deployed using coaxial cable (COAX), multi-pair Ethernet cable or a combination of media.

Key to the successful operation of an xDSL system is a splitter composed of a conventional low pass voice-band filter and a high pass or band pass data filter matched to the specific xDSL profile employed by the system. Other signal enhancement, noise mitigation and signal conversion techniques are also employed within the splitter. A base module and an add-on module; collectively also referred to as a splitter-filter or splitter-filter-balun; are typically located within a Network Interface Device (NID) which may be located at the premise demarcation point where, in general, the telephone line enters the premise, or at a wall plate or other location within the premise.

The NID is a physical box, or enclosure, commonly located outside of a residence or building in close proximity to where the telephone line(s) from the Telephone Companies Central Office (CO) interconnects with the residence or buildings internal communications wiring. This interconnect point forms what is often referred to as "the demarcation point." As such, the demarcation point is often at the physical NID. However, a Multi Dwelling Unit (MDU) for example might have a distribution panel within a common communications room on the ground floor with the demarcation point being located at a Wall Plate within each unit.

Within each NID enclosure a method is required to facilitate the physical inter-connection of the CO UTP, COAX, or other transmission media with the premise's hard wiring or other transmission media. A module with attached interconnect apparatus, typically screw terminals, is secured within the NID to accomplish the interconnection.

xDSL splitter, filter and signal conditioning devices may also be located at the NID interconnect point. Over the years a variety of NID enclosures have been fielded; with each model having differing physical configurations and orientations and, as such, require current art xDSL devices to take a form that will only fit within a specific model NID; therefore a very large number of physically different xDSL devices must be created for each xDSL profile and each of these devices must have several versions to support their associated enhancement modules. Thus creating a large number of physically different xDSL devices is required to support the many NID installations and types that are currently deployed in the field.

Conventional Splitter-filters are only matched to one xDSL profile, are constructed as a single fixed dual slot unit, and can not accommodate reconfigurations or add-on enhancements. Thus, as the xDSL system develops, or is modified to use a second xDSL profile, conventional splitters must be physically replaced with a second conventional splitter, with the second conventional splitter matched to the second xDSL profile. The need for multiple xDSL splitters, each matched to a specific xDSL profile, as well as the physical installation required each time an xDSL profile is changed; increases the cost of operating and maintaining the xDSL system.

Furthermore, conventional splitter-filter modules require two adjacent slots to fit within any NID. The package enclosing multiple filter modules is large overall and, as such, the number of remaining available slots for future expansion within a NID is reduced.

Conventional technology does not provide means for feature set expansion or customization as part of the splitter-filter module. For example; a balanced two (2) wire differential circuit conversion to an unbalanced coaxial single-ended circuit would require a complete new device. Conventional technology is either a stand alone splitter-filter module or a combination splitter-filter-balun module. They are not field upgradeable and must be replaced at considerable expense both in parts and skilled labor if, for example, the profile filtering or output connectivity required adjustment, re-configuration or replacement.

The vast majority of conventional splitter-filter modules currently used today employ screw terminals to make connections between the network and the premise or buildings internal wiring requiring special tools, extra labor by skilled technicians and occupying excess space within the NID.

Conventional technology requires a unique and separate form factor package for each type of currently available NID enclosure deployed in the US market today. These styles are commonly referred to as the Sekor ("S") and Keptel ("K") type NID; with each model type footprint mount interface being different, and there is little or no physical commonality between the two styles; therefore each type and model requires an interconnect scheme and splitter module of different physical shape Conventional art splitter modules do not provide a means of attaching auxiliary modules or brackets, as may be required for the addition of associated hardware, mechanical network system customization, security features and their fit and form factor can not be mounted in both flat bottomed, recessed well, or pocket NID enclosures.

Conventional splitter devices are not mechanically or electrically modular in nature, thus do not accommodate field configuration of xDSL profile filtering, system enhancements or variations in interconnect while still remaining in one single line space footprint. Conventional splitters do not provide an add-on means to use alternate connector types other than several specific splitter modules have been developed that employ the coaxial "F" connector style.

Specifically; the use of existing technology would require AT&T to replace all installed 3-line space NIDs in the entire AT&T/BellSouth region to complete their on-going VDSL2 (Project Lightspeed) Deployment.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

Exemplary embodiments of the present invention provide means whereby a common circuit assembly is easily matched to a specific xDSL profile with the insertion of a xDSL profile add-on module into the common assembly, or by remote activation of profile selection switches or the like. Also, a further selection of the data interface type and physical interconnect method is accommodated.

According to an aspect of the present invention, there is an apparatus for splitting an input signal, the apparatus including a xDSL profile filter for filtering a first sub-signal from the input signal, the first sub-signal according to a xDSL profile, and outputting a xDSL profile output signal; a voice-band filter for filtering a second sub-signal from the input signal, the second sub-signal according to a voice frequency band, and outputting a voice-band output signal; and a user interface for selecting a xDSL profile mode.

The xDSL profile mode may be consistent with one of a plurality of xDSL profiles, and the xDSL profile filter may filters the first sub-signal according to the xDSL profile mode.

The xDSL profile filter may include a plurality of cascaded filters corresponding to the plurality of xDSL profiles, and the xDSL profile filter may enable a filter of the plurality of cascaded filters corresponding to the selected xDSL profile mode and may disable the filters of the plurality of filters corresponding to the unselected xDSL profile modes.

The apparatus for splitting an input signal may further include a Public Switched Telephone Network (PSTN) twisted pair interconnect terminal for receiving the input signal; a data output wiring interconnect for providing the xDSL profile output signal; and a plain-old telephone service wiring interconnect for providing the voice-band output signal.

The apparatus for splitting an input signal may further include a surge protection device connected to the PSTN twisted pair.

Exemplary embodiments of the present invention electrically partition the various ITU-T reference models such that performance and signal integrity are maintained within the xDSL system while, at the same time, providing a means of using a base unit occupying a one-line space single slot, with optional add-on modules and adapter assembly, thus allowing this combination to be deployed in any variety of fielded NID enclosures.

By occupying only a single line slot within the NID, smaller limited slot NID enclosures can be upgraded to xDSL without replacement of the NID thus providing significant cost and labor advantage.

Exemplary embodiments of the present invention are predicated on a field configurable single slot Base Unit splitter that serves as a basic "building block" splitter-filter module that is mechanically and electrically modularized to allow for simple and easy configuration in the field. This modularized concept can also include, but is not limited to, balun and other signal enhancement technology as well as all xDSL profile filtering. Also, this modularized concept can be used to accommodate signal connectivity, primarily at a customer premise, to interconnect or intra-connect any variety of amplifiers, wireless, Fiber Optic, HDTV and other current and future communications medium.

The Base Unit provides screw bosses on the outside of the Base Unit as well as anti-rotation features to facilitate the mounting of auxiliary components such as, but not limited to, brackets for the attachment of said components as well as security features or other suitable components. Brackets and strain relief components may be used to prevent accidental dis-mate of the network connections while the NID is being serviced by provider personnel as well as discourage/prevent others from tampering with the existing connections.

Base Unit and Universal Bracket allow flat surface as well as sub-surface "deep well" NID enclosure mounting and will fit AFL, Corning Cable Systems, and Tyco K, S and Universal NID footprints.

Add-on Module can be attached to the Base Unit in three different positions allowing for the Add-on Module connector to be pointed in any of three different orientations in space. This "three degrees" of freedom orientation allow for better alignment with external or internal interconnects or cables and easier manipulation of the interconnect device resulting in optimum cable management and routing.

Using a combination of Base Unit, Add-on Module and Universal Mounting Bracket allows for the removal and replacement of devices during upgrades without the need to interrupt the existing network wiring within the NID and allows hook up can be done outside of the NID providing easier access for torque tools, wrenches, connectors, and the like.

The standard RJ45 test connection; widely used in the industry for network trouble shooting, is provided at the Base Unit.

Modular splitter construction provides a service provider with the ability to easily field test signal enhancements, various noise filtration schemes, premise wiring configurations and the like during installation allowing system optimization on a per installed premise basis.

BRIEF DESCRIPTION OF THE DRAWINGS

The aspects of the present invention will become more apparent by describing in detail illustrative non-limiting embodiments thereof with reference to the accompanying drawings, in which.

DETAILED DESCRIPTION OF EXEMPLARY EMBODIMENTS OF THE INVENTION

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 3:
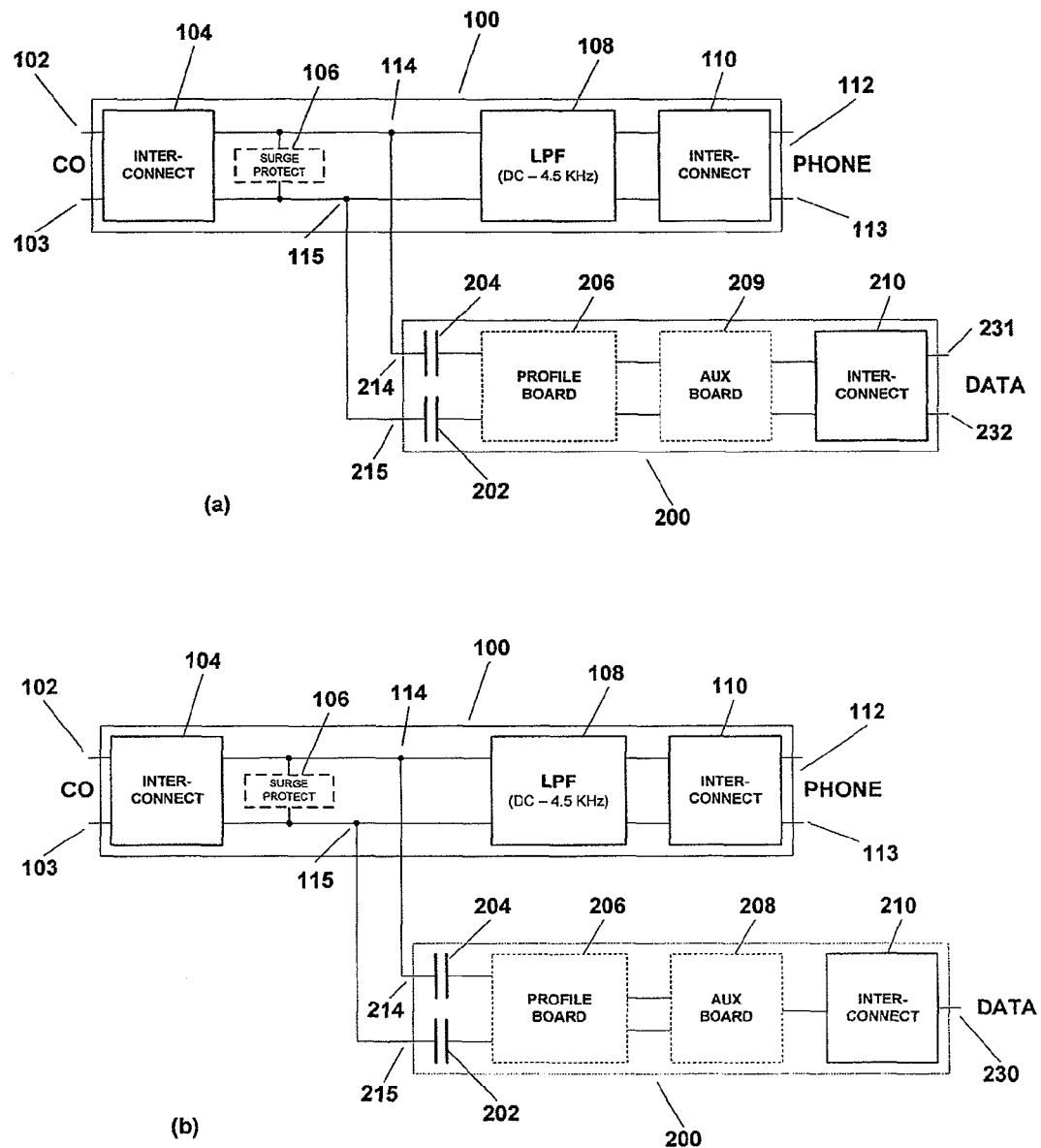
FIG. 3. shows the critical partitioning of the ITU-T reference model that facilitates dividing the system without degradation while providing the required application development, circuit and physical mechanical flexibility according to exemplary embodiments of the present invention. A differential configuration is shown in (a) and a single-ended configuration is shown in (b) where "CO" is the Central Office outside plant unshielded twisted pair (UTP), coaxial cable (COAX) or other media entering the premise; "Phone" represents the voice circuit media or wiring within the premise; and "DATA" is associated with the xDSL premise media or wiring. It is this partition technique, while maintaining high signal integrity and performance, that allows for modularization and a broad development flexibility.

By combining Radio Frequency (RF) design techniques with specially built very low frequency (VLF) through high frequency (HF) Vector Network Analyzer (VNA) test and measurement equipment; it has been discovered that the ITU-T xDSL reference models can be partitioned as shown in FIGS. 3 (*a*) and (*b*) without loss of performance or system degradation. If careful consideration of complex impedances over the full frequency band of interest is taken into account, and modem mixed-mode scattering parameter methodologies (M-M S-Par) are employed, full and complete sets of parametric data can be derived for component, board, module and system elements. This comprehensive parametric data is, in turn, used to perform very accurate functional synthesis, circuit design and full system analysis. Through very accurate detailed analysis and simulation; it is further discovered that a particular reference model partitioning could maintain optimum performance while providing a great deal of electrical and mechanical flexability in development of xDSL splitter-filtering, signal enhancement, mechanical design, physical configuration, and interconnectivity.

Figure 1:
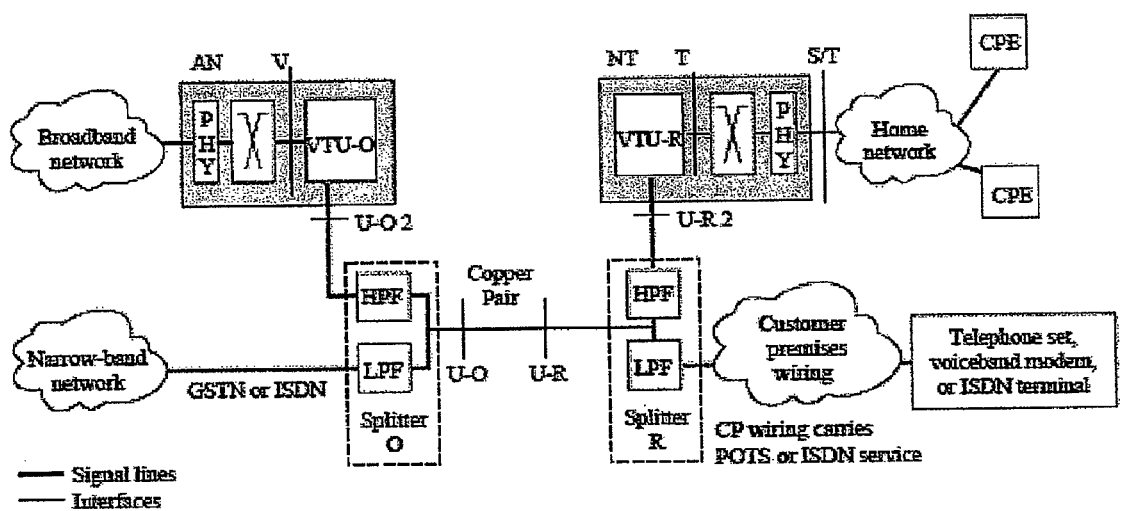
FIG. 1. is a generic application reference model according to ITU-T G.993.2 (02/2006) section 5, subsection 5.4 for remote deployment with splitter showing data service with underlying POTS service. Data service only and data service with underlying ISDN service application reference models are not shown. Although the diagram refers to the VDSL2 transceiver unit (VTU), a more generic xDSL expression is used herein to encompass all DSL schemes. Of particular interest is the block labelled "Splitter R" which inter-connects the Central Office "Copper Pair" to the "Customer premise wiring" through a Low Pass Filter (LPF) and the VTU-R (where R is remote) through a High Pass Filter (HPF). The VTU-R is also commonly called the Modem at the customer premise. Designations U-O, U-R, U-R2 refer to interfaces that are defined within the specification. Section 14 "Electrical requirements" of the specification, and in particular subsection 14.2 "Service Splitters" is left up to developers to further define.
Figure 2:
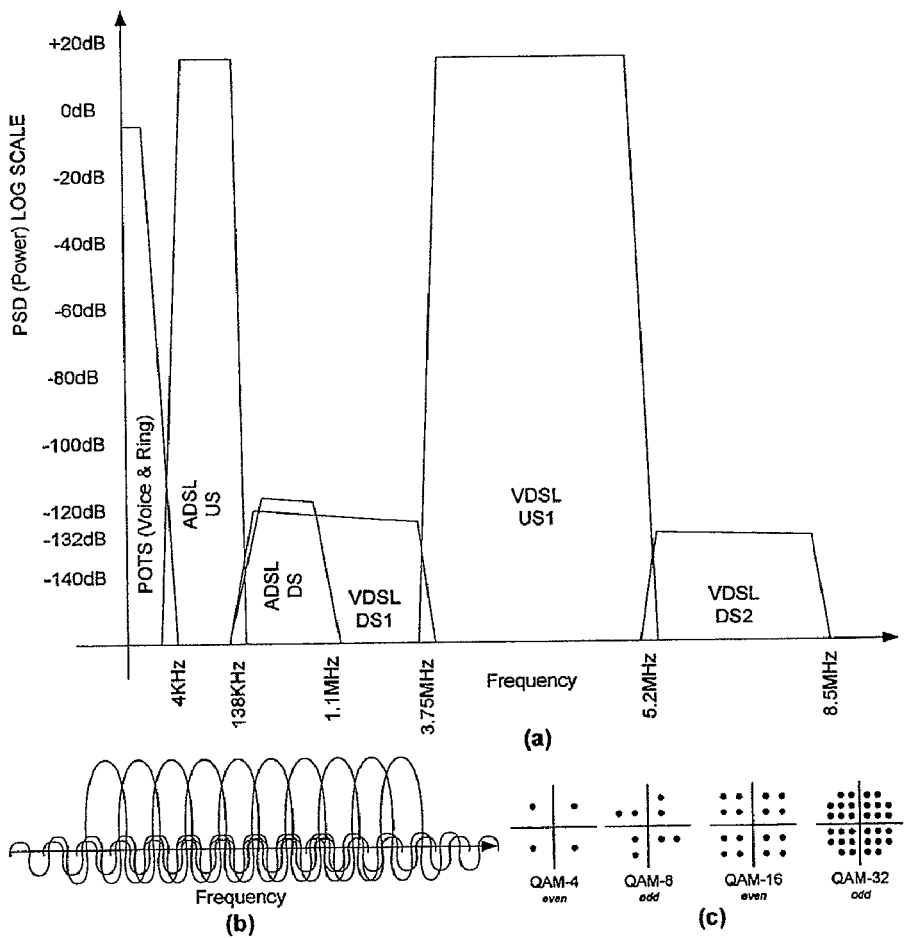
FIG. 2. outlines a conventional premise side simplified signal spectral plot of the duplex xDSL signal for typical VDSL2 8a profile (a), a small representative section of the orthogonal channel structure Discrete Multi Tone (DMT) modulation scheme (b), and diagrams of four possible quadrature modulation constellations that each of the possible 512 DMT channels might employ based upon their specific signal to noise ratio (SNR). A full description of all profile DMT structures is found in ITU-T G.993.2.

An appreciation of the design partition complexity can be realized by examination of the xDSL bi-directional signal makeup of the example VDSL2 Profile 8a in FIG. 2. Briefly; the frequency band is sub-divided into a voice band, uplink (US, US1) bands and downlink (DS, DS1, DS2) bands where both ADSL and VDSL2 channels may be present as shown in the Power Spectral Density (PDS) versus Frequency plot in FIG. 2 (a). The system uses an orthogonal channel structure presented in FIG. 2 (b) to save bandwidth and employs quadrature amplitude modulation (QAM) with up to 32 bits per carrier as outlined in constellation diagrams (c). Theoretically, up to 512 channels can be filled with up to 32 bits per channel. Each channel bit fill is known as a Bin, with the maximum fill depending on the individual channel signal to noise ratio (SNR). This feature distinguishes xDSL Discrete Multi Tone (DMT) modulation from Orthoginal Frequency Division Multiplexing (OFDM) modulation which employs only a fixed Bin. DMT requires critical signal levels, demanding phase preservation and very good noise performance to ensure optimum system operation.

FIG. 3 shows simplified diagrams for optimized partitioning of the xDSL reference model according to a first exemplary embodiment of the present invention. This partitioning includes PSTN twisted pair interconnect terminal 104, surge protection device 103, xDSL profile filter 206, low pass voice band filter 108, data interconnect 210, POTS interconnect 110, matching capacitors 202/204 and Auxiliary (AUX) Board 209.

As an example of this partition, consider in FIG. 3. (a); where the Add-on Module 200 used Aux Board 209 with a straight-through connection; thus profile filter 206 output is balanced and interconnect 210 would provide differential interconnects 231 and 232. In FIG. 3 (b) the Aux Board 209 consists of a balanced to unbalanced conversion device (Balun) such that interconnect 210 provides a single-ended interconnect 230. As a further example; consider a profile board 206 providing a high pass filter (HPF) function with cut off frequency of 25 KHz followed by an Aux Board 208 containing a Balun. Although technically complex to develop, these straight forward examples emphasize the valuable features of this pardoning approach. The voice filter and xDSL filter can now be co-located and provide independant functions which, in turn, separate the Base Unit from the Add-on Module allowing a great deal of flexibility and savings in electrical and mechanical development, manufacture, distribution, warehousing, system deployment and re-configuration.

Figure 4:
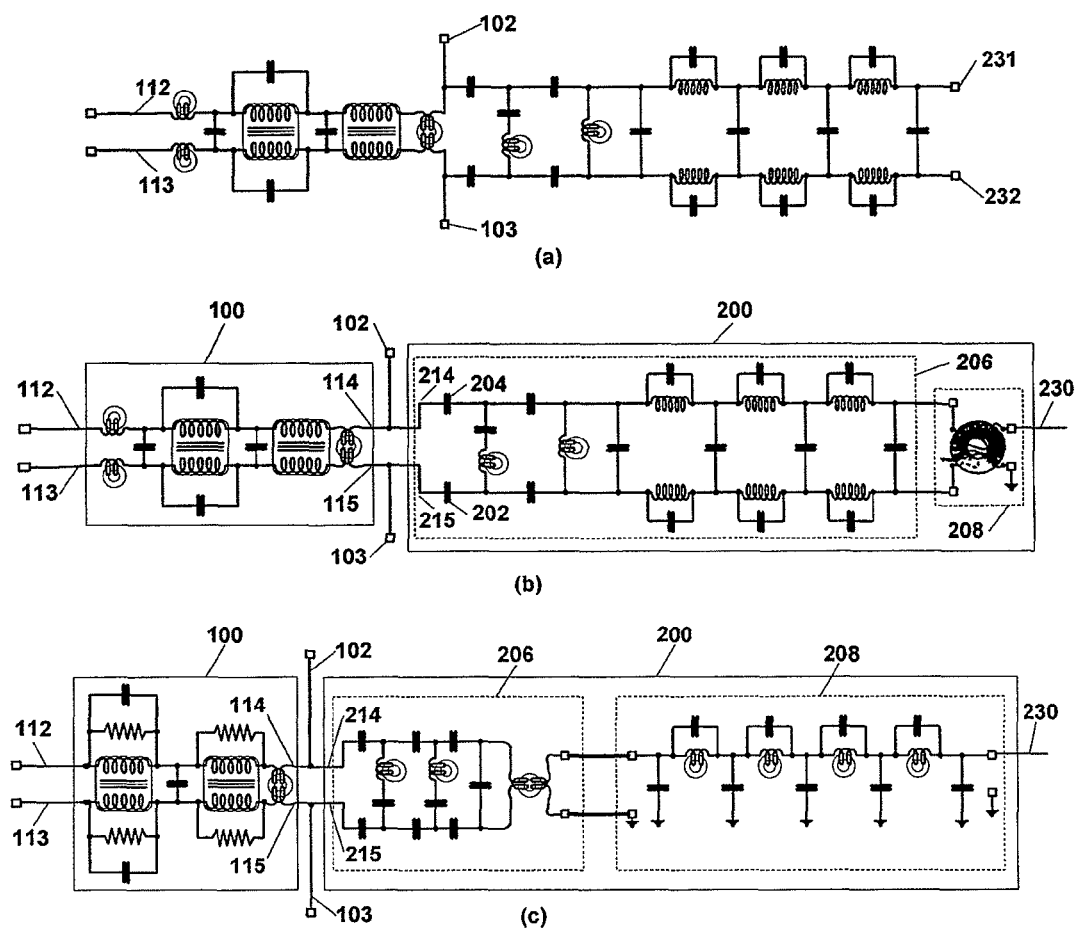
FIG. 4. includes three (3) example simplified schematics of passive element differential and single-ended splitter-filter circuits according to exemplary embodiments of the present invention. A typical fixed configuration, dual wide NID slot, single fixed housing, differential splitter-filter is shown in (a); the same circuit topology is shown in (b) however the circuit is partioned and includes an added balanced to unbalanced (Balun) circuit transformation device providing single-ended interconnect. A third partitioned topology is shown in (c) where the xDSL filter interconnect is single-ended.

In FIG. 4, several passive circuit configurations of the splitter-filter and splitter-filter-balun are shown. FIG. 4. (a) presents the schematic of a high performance balanced xDSL profile filter topology with differential interconnect without partitioning. UTP POTS xDSL signal interconnects at 102/103 and is internally connected with the voice filter and xDSL data profile filter. This configuration is typical of current art.

Optimum partitioning is indicated in FIG. 4. (b) where CO POTS interconnects 102/103 with the Base Unit 100, housing the voice filter 108, at 114/115 and interconnects with Add-on Module 200 at 214/215. Internal to the Add-on Module 200 is an xDSL Profile Board 206 and balun Aux Board 208 with single-ended data interconnect 230. Another high performance splitter circuit with similar voice filtering 108 housed in the Base Unit 100 is shown in FIG. 4 (c), however, this xDSL profile filter uses a different topology with differing characteristics where a balanced first filter section 206 is combined with a single-ended second filter section 208 providing a single-ended interconnect 230.

The splitter circuit configuration of the first embodiment is designed to support a functional partition whereby a main assembly Base Unit supports functions that are common to all xDSL profile configurations and an Add-on Module further supports functions that are specific to particular xDSL profiles and enhancements. Individual and separate interface and interconnect functions are also supported.

Functions that are common to all xDSL profile configurations including the PSTN twisted pair interconnect 104 with terminals 102/103; a surge protection device 106, if required; a low pass voice band filter 108, and a POTS wiring interconnect 110 and terminals 112/113.

The first exemplary embodiment includes a passive xDSL splitter-filter assembly 200 including an xDSL Profile Board 206, data Interconnect type 210 with physical interconnect means that are plugged onto the common Base Unit 100 assembly to form a complete splitter. This splitter circuit can contain any combination of profile, interface, and interconnect, as required by the application or installation. For example; if a premise contained only usable twisted pair wire or only usable coaxial cable, at installation the technician could choose an Add-on Module with the appropriate interconnect, or, if the current distribution media in use were to become non-operable, only an Add-on Module Interconnect 210 change would be required to interface with a different distribution media type. A further example; if a premise were located some distance from the CO, a receive signal amplifier splitter-filter combination Add-on Module 200 could be deployed in place of the original splitter-filter. Or, if a local radio station or other source were causing excessive interference within the xDSL band, a notch filter Add-on Module might be deployed at the time of the installation, or, as an upgrade or repair.

Figure 5:
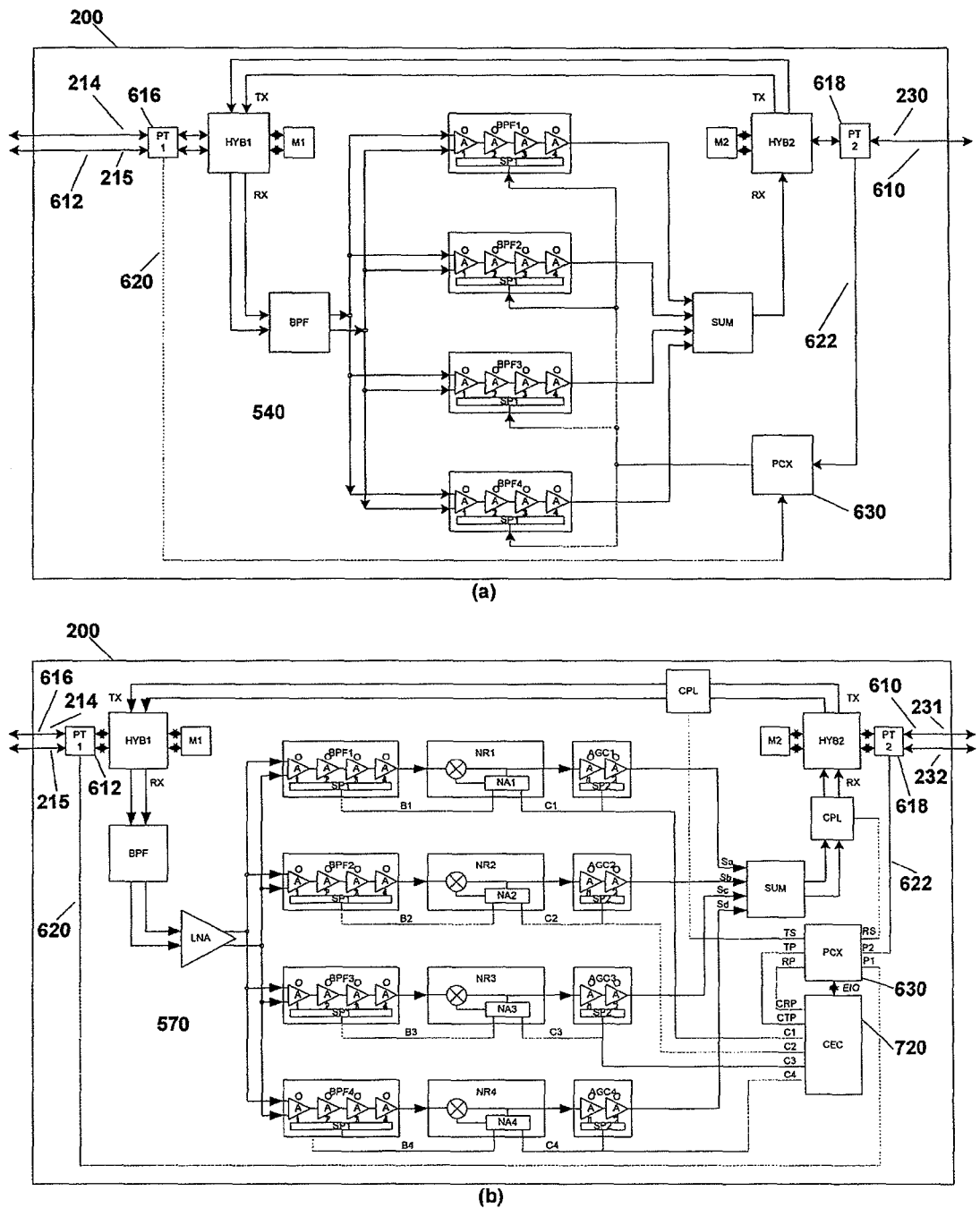
FIG. 5. shows detailed block diagrams outlining two (2) of the many active filter and signal enhancement circuits that are deployed within the add-on module according to an exemplary embodiment of the present invention. Power for the active integrated devices is either via POTS system from the CO, or back-fed to the add-on module through the Data media from the premise. An integrated active profile filter and signal conditioner is shown in (a), and a programmable integrated active XDSL profile filter with remote selector, intelligent receive noise mitigation and transmit power monitor is shown in (b).

FIGS. 5 (a) and (b) include the use of active components to achieve xDSL profile filtering and other performance enhancements according to a second exemplary embodiment of the present invention. The integrated active circuit and support components reside within the Add-on Module 200 and make use of the module interconnects 104 via 114/214, 115/215 and 210.

FIG. 5. (a) is an integrated active xDSL profile filter 540 with a means of receiving external power either from the CO POTS interconnect 104/620 or through premise wiring interconnect 210/610/622 by employing on-board Power Taps and selectively routing the power source by an on-board switch 630. Power is currently provided on the POTS system along with the voice and xDSL data signal through 214 and 215. Premise side power is made available by adding a power source within the Premise and super-imposing a voltage 610 onto the xDSL premise data signal wiring and interconnect 230.

FIG. 5. (b) shows an integrated active xDSL profile filter with noise mitigation and xDSL signal gain boost features 570. This circuit is powered from the CO or Premise using similar methods as those previously described for (a). Additional features include remote programming and monitoring capability, enhanced internal power control and transmit power monitoring. Circuits shown in FIG. 5. (a) and (b) are covered in more detail in co-pending disclosures and are incorporated herein to tie the concepts together.

The circuits shown in FIG. 4. (a), (b) and (c) employ passive components and, as such, do not require an external power source and are not capable of electronic signal amplification whereas the circuits of FIG. 5. (a) and (b) employ integrated active components and, as such, do require an external power source and are capable of electronic signal amplification and other sophisticated xDSL signal manipulations.

The second exemplary embodiment involves active circuitry, external powering, location of the xDSL Add-on Module 200 remote from the Base Unit 100 while interconnecting and programming same through any technically appropriate means. The method of attachment and interconnection of the module onto the assembly or remotely interconnecting the assembly to the module without degradation of performance is accomplished by ensuring proper match conditions between the devices while considering the medium, for example coaxial cable or balanced twisted pair wires, ethernet cable, magnetic inductive coupling, optical coupling or electromagnetic radiation coupling.

Figure 6:
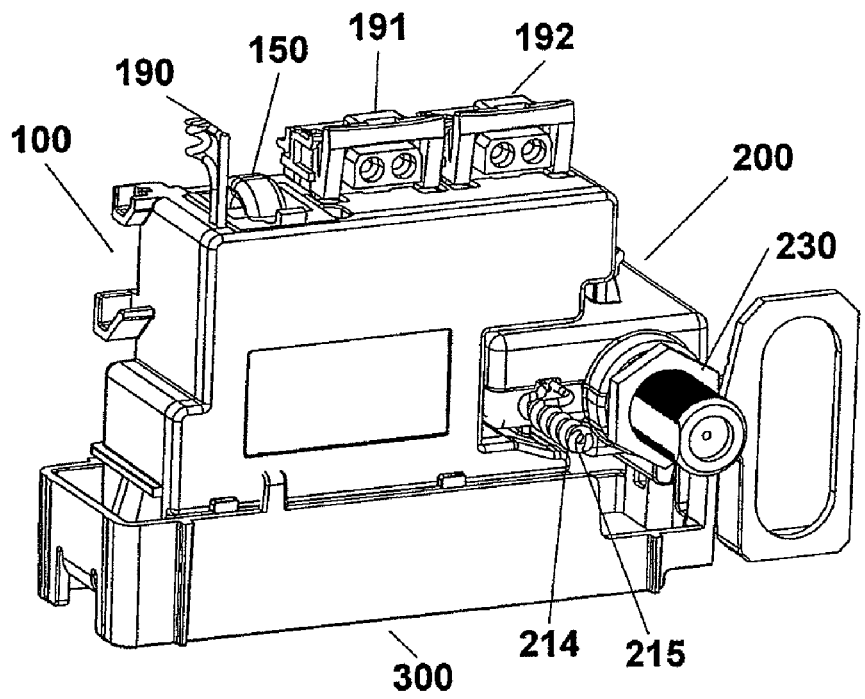
FIG. 6. is a physical integrated assembly of the Base Unit, Add-On Module and Universal Mounting Bracket according to an exemplary embodiment of the present invention.
Figure 6:
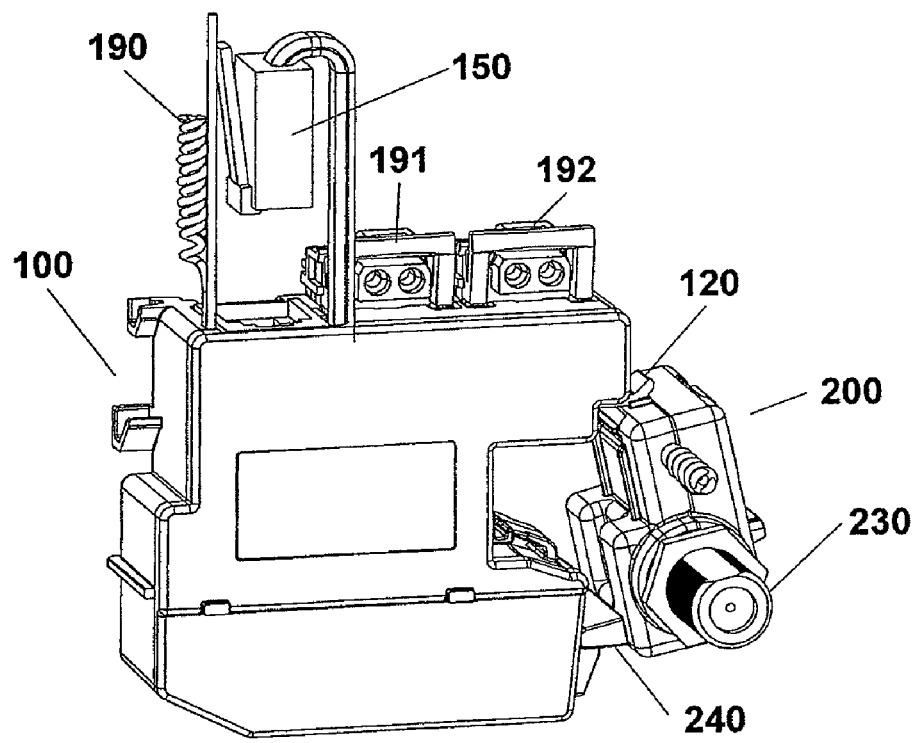

FIG. 6. (a) shows assembly of the Base Unit, Add-on Module and Universal Mounting Bracket according to a third exemplary embodiment of the present invention. This combined assembly, or parts thereof, have been successfully tested to properly fit and secure within these NID enclosures: AFL (Keptel) SNI-4300 w/K-footprint without recess; AFL (Keptel) SNI-4600 w/K-footprint without recess; Tyco/AFL (Keptel) SNI-4300 w/S-footprint—need to use Adapter; Tyco/AFL (Keptel) SNI-4600 w/S-footprint—need to use Adapter; Corning (Siecor) CAC 7300 (S-footprint)—need to use adapter; Corning (Siecor) CAC 7600 (S-footprint)—need to use adapter; Corning (Universal) UNI 3003—need to use adapter; Corning (Universal) UNI 3006—need to use adapter. The above NID group represents the vast majority of NID enclosures currently installed in the field. To the best of our knowledge; there are no other generally deployed NID enclosures that will not accept the subject assembly using it's various configurations.

In FIG. 6, the. The third exemplary embodiment includes a base unit 100 with internal and external features that provide a means to mechanically and electrically connect the base unit 100 to the NID 400 enclosure and corresponding telephone network connections as well as the connections to the add-on module 200.

Figure 7:
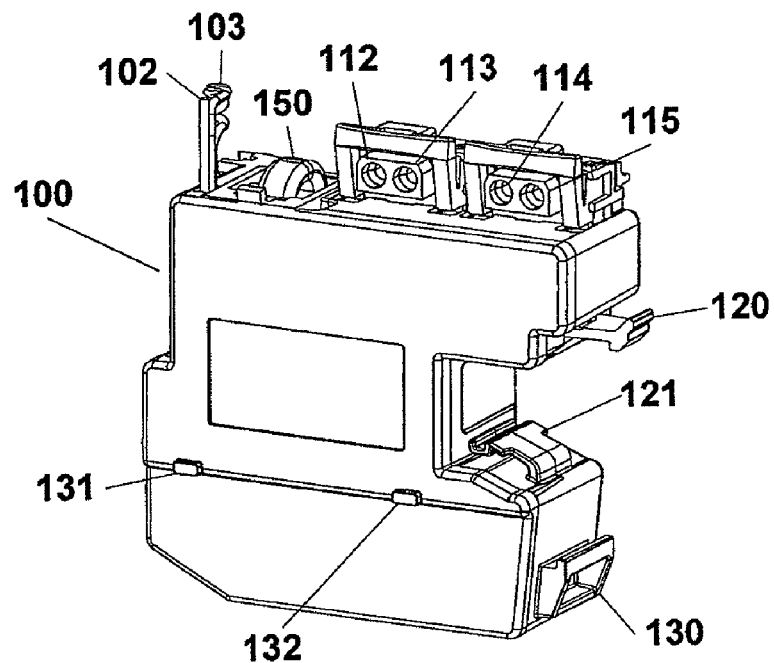
FIG. 7. shows the Base unit mechanical diagram left view according to an exemplary embodiment of the present invention.
Figure 8:
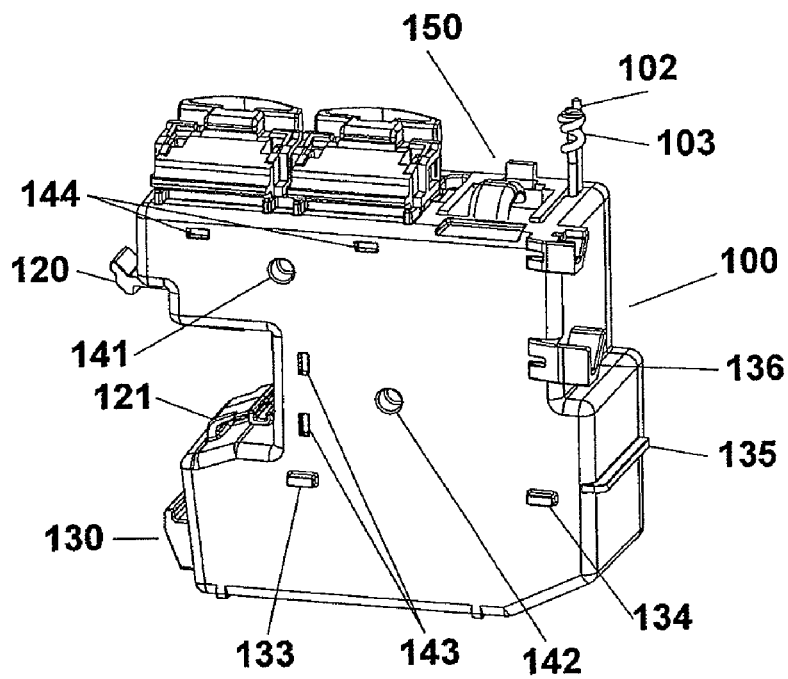
FIG. 8. is the Base unit mechanical diagram right view according to an exemplary embodiment of the present invention.
Figure 11:
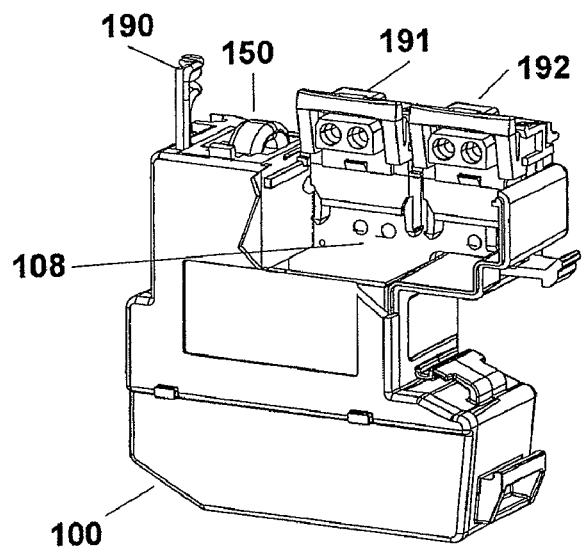
FIG. 11. provides a Base Unit cut-away left view exposing part of the internal circuit board assembly with differential insulation displacement connector attachment locations according to an exemplary embodiment of the present invention.

In FIG. 6, FIG. 7 and FIG. 8 are features including the interconnects 102, 103 and 190 from the PCB 108 shown in FIG. 11 inside the base unit 100 that connects to the external network wiring present in the NID 400. Also present are one or more IDC connectors 191 and 192 with openings 112, 113, 114 and 115 for interconnects from the add-on module 200 required to electrically connect to the base unit 100. The base unit 100 includes an RJ cable 150 coming from inside the base unit 100 from the PCB 108 and connects to the female RJ connector used for testing of the base unit and the signal coming from the Central Office (CO).

Figure 9:
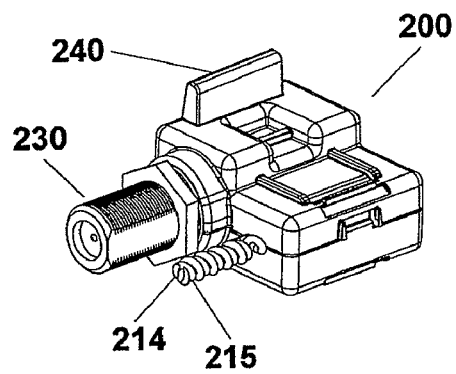
FIG. 9. diagrams the Add-On Module configured with a coaxial cable F-Connector premise wiring interconnect and UTP wire Base Unit interconnect according to an exemplary embodiment of the present invention.
Figure 12:
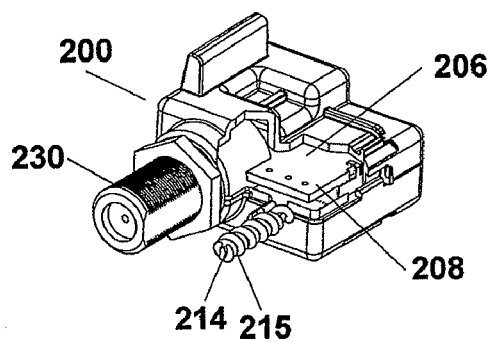
FIG. 12. provides a Add-on Module cut-away view revealing a two layer stacked circuit board assembly with UTP wire interconnect, F-Connector interconnect and balun shield housing according to an exemplary embodiment of the present invention.

The add-on module 200 shown in FIG. 9 and FIG. 12 is mechanically mounted to the base unit 100 in any of three different orientations. In the first two mounting orientations the add-on module 200 is secured to the base unit 100 by snap fit hook 120 and 121 of the base unit 100. The difference being the two mountings is the orientation of the F-connector 230 with respect to the mounting of the base unit 100 inside the NID 400 enclosure. The base unit 100 is engineered to interface with features within the NID 400 to provide a means for mounting of the base unit 100 into many different NID 400 styles from multiple manufacturers. Some of these features including 130 and 136 are shown in FIG. 8.

A receiving catch 130 in the base unit 100 engages a hook type feature common to the "K" style footprint NID 400 enclosures and rotates via an axis normal to the front plane of the base unit 100 and the base unit 100 is seated in the NID 400 when one or more attachment arms 136 of the base unit 100 body are secured and received by the mating interface features in the NID 400. Depending on the particular NID 400 into which the base unit 100 is installed, the orientation of the base unit 100 can be either as shown in FIG. 8 or it can be rotated 180 degrees about a vertical axis normal to the base of the NID 400 and installed into same or similar type features commonly known to anyone skilled in the art. When this mounting is used the add-on module is rotated 180 degrees about the horizontal axis and is installed with the F-connector 230 pointing in the opposite direction when installed in the 120 and 121 hooks.

The add-on module 200 can also be mounted on the side of the base module as shown in FIG. 6B by engaging the mounting ear 240 on the add-on module 200 with the catch 130 on the base module 100 and rotating it CCW until it snaps into position with the hook 120 on the base module 100. The add-on module 200 includes external interconnects 214 and 215 shown in FIG. 12 coming from PCB 206 and 208 to make electrical connections with the base unit 100.

Figure 13:
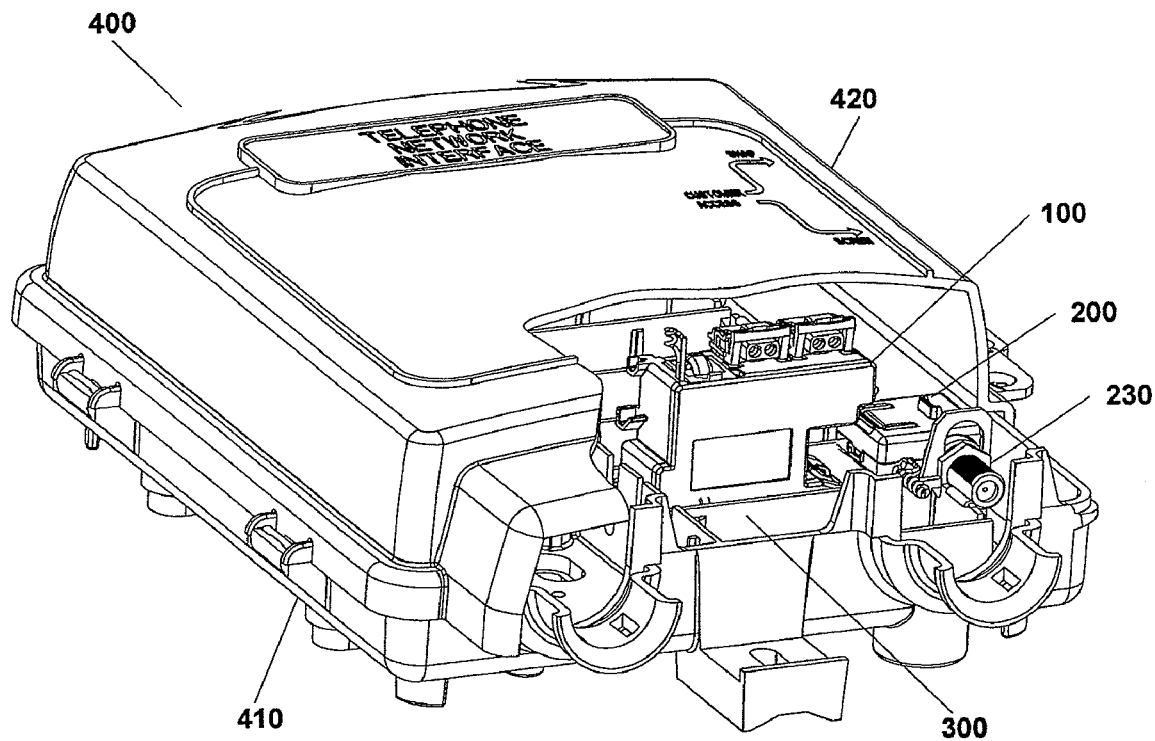
FIG. 13. diagrams a typical NID enclosure single line slot application with cut-away view to show installed Base Unit, Add-on Module and Universal Mounting Bracket according to an exemplary embodiment of the present invention.

The base unit 100 also includes anti-rotation features 143 and 144 along with mounting bosses 141 and 142 that provide a means to connect auxiliary mounting brackets and devices that can be used to mount optional hardware as needed for present and future requirements. The base unit 100 also includes support features 131, 132, 133 and 134 shown in FIG. 7 and FIG. 8 that are used when mounting with the universal mounting bracket 300 shown in FIG. 10. The base unit 100 can also be installed into the "S" style NID 400 by the addition of the universal mounting bracket 300 as shown in FIG. 13 and if required by field technicians it may also be used in the Universal style NID 400 enclosure.

Figure 10:
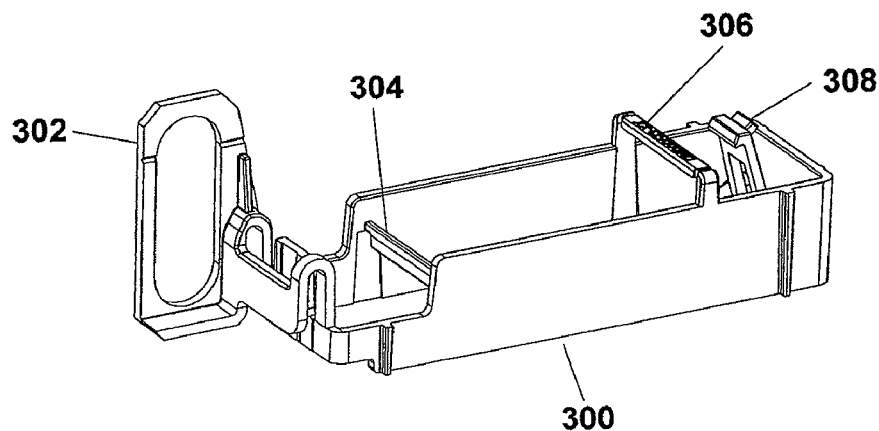
FIG. 10. is a drawing of the Universal mounting bracket with all break-away components in place according to an exemplary embodiment of the present invention.

Universal mounting bracket 300 shown in FIG. 10 locates within a single line space of the NID 400. It is typically secured by but not limited to protrusion like features in the NID with undercut formed heads that capture and hold the bracket into position. These features are commonly referred to as snap fits. The base unit 100 is mounted to this universal mounting bracket 300 in a one of several mounting locations in the universal mounting bracket 300 one of which is shown in FIG. 6A. In this figure the catch feature 130 of the base unit 100 is engaged into the snap hook on the universal mounting bracket 300 and is rotated CCW until feature 135 of the base unit snaps into position under the snap finger hook 308 of bracket universal mounting bracket 300.

There are a multiple mounting arrangements and positions of the base unit 100 into the universal mounting bracket 300. These are accomplished by simply removing cross bar link 304 or 306 either by hand or by the use of tools common to the technicians in the field.

The universal mounting bracket 300 enables the base unit 100 to be installed in the position shown in the FIG. 6A or by removing the cross bar link 304 of the universal mounting bracket 300 and shifting the base unit 100 to the right side of the universal mounting bracket 300 and using rib feature 135 in the base unit 100 hook and rotate the base unit 100 CW until it is secured it into the universal mounting bracket 300 by engaging the other snap fit on left side of the part as shown in FIG. 10. This locates the base unit 100 in a different position from left to right inside the NID 400 in order to provide different mounting position options for the field technician to facilitate the installation of the coax cable connection when required to clear other modules within the NID 400 where access is limited because of adjacent modules in NID 400 or where case 410 and cover 420 geometry constraints exist.

Also present in the design of the universal mounting bracket 300 is a vertical flange 302 with an open slot in which the add-on module 200 can be detached from the base unit 100 and mounted independently into the universal mounting bracket 300 as needed for vertical adjustment in order for the F-connector 230 to clear other modules and devices within the NID 400. This flange also includes a breakaway feature at the top of 302 to facilitate installing coax cable to the add-on module 200 outside of the NID 400. The add-on module 200 coupled with the cable and or wiring can now be installed in a Z-axis manner into the now open vertical flange 302 inside of the NID 400 and secured with the jam nut supplied as part of the add-on module 200 or left loose to maximize cable routing options within the NID 400 in order to minimize bend radius attenuation of the fiber optic cable.

The vertical flange 302 of the universal mounting bracket 300 is also designed to be removable if required because of space constraints or if desired by field technicians.

The universal mounting bracket 300 is also designed to be modified by adding holes and mounting additional brackets if required to mount any additional devices in order to facilitate network connection installations or provide strain relief of any wiring or cables coming from or to the base unit 100 or the add-on module 200 or the combination of the two It is contemplated that numerous modifications may be made to the exemplary embodiments of the invention without departing from the spirit and scope of the embodiments of the present invention as defined in the following claims.

What is claimed is:

1. An apparatus for splitting an input signal, the apparatus comprising:
    a first circuit module comprising a xDSL profile filter for filtering a first sub-signal from the input signal, the first sub-signal according to a xDSL profile, and outputting a xDSL profile output signal;
    a second circuit module comprising a voice-band filter for filtering a second sub-signal from the input signal, the second sub-signal according to a voice frequency band, and outputting a voice-band output signal; and
    a user interface for selecting a xDSL profile mode,
    wherein the first circuit module is adapted to be removably attached to the second circuit module,
    wherein the xDSL profile mode is consistent with one of a plurality of xDSL profiles, and
    wherein the xDSL profile filter filters the first sub-signal according to the xDSL profile mode.

2. The apparatus of claim 1, wherein the xDSL profile filter comprises a plurality of cascaded filters corresponding to the plurality of xDSL profiles, and
    wherein the xDSL profile filter enables a filter of the plurality of cascaded filters corresponding to the selected xDSL profile mode and disables the filters of the plurality of filters corresponding to the unselected xDSL profile modes.

3. The apparatus of claim 2, further comprising:
    a Public Switched Telephone Network (PSTN) twisted pair interconnect terminal for receiving the input signal;
    a data output wiring interconnect for providing the xDSL profile output signal; and
    a plain-old telephone service wiring interconnect for providing the voice-band output signal.

4. The apparatus of claim 3, further comprising:
    a surge protection device connected to the PSTN twisted pair.

5. An apparatus for splitting an input signal, the apparatus comprising:
    a first circuit module comprising a xDSL profile filter for filtering a first sub-signal from the input signal, the first sub-signal according to a xDSL profile, and outputting a xDSL profile output signal;
    a second circuit module comprising a voice-band filter for filtering a second sub-signal from the input signal, the second sub-signal according to a voice frequency band, and outputting a voice-band output signal; and
    means for connecting a user interface for selecting a xDSL profile mode,
    wherein the first circuit module is adapted to be removably attached to the second circuit module,
    wherein the xDSL profile mode is consistent with one of a plurality of xDSL profiles, and
    wherein the xDSL profile filter filters the first sub-signal according to the xDSL profile mode.

6. The apparatus of claim 5, wherein the xDSL profile filter comprises a plurality of cascaded filters corresponding to the plurality of xDSL profiles, and
    wherein the xDSL profile filter enables a filter of the plurality of cascaded filters corresponding to the selected xDSL profile mode and disables the filters of the plurality of filters corresponding to the unselected xDSL profile modes.

7. The apparatus of claim 6, further comprising:
    a Public Switched Telephone Network (PSTN) twisted pair interconnect terminal for receiving the input signal;
    a data output wiring interconnect for providing the xDSL profile output signal; and
    a plain-old telephone service wiring interconnect for providing the voice-band output signal.

8. The apparatus of claim 7, further comprising:
    a surge protection device connected to the PSTN twisted pair.

9. A method for splitting an input signal, the method comprising:
    electing a xDSL profile mode;
    filtering, with a first circuit module, a first sub-signal from the input signal, the first sub-signal according to a xDSL profile, according to the selected xDSL profile mode, and outputting a xDSL profile output signal, wherein the filtering is performed by a xDSL profile filter; and
    filtering, with a second circuit module, a second sub-signal from the input signal, the second sub-signal according to a voice-band, and outputting a voice-band output signal,
    wherein the first circuit module is removably attached to the second circuit module,
    wherein the xDSL profile mode is consistent with one of a plurality of xDSL profiles.

* * * * *